US010929600B2

(12) United States Patent
Fan

(10) Patent No.: US 10,929,600 B2
(45) Date of Patent: Feb. 23, 2021

(54) METHOD AND APPARATUS FOR IDENTIFYING TYPE OF TEXT INFORMATION, STORAGE MEDIUM, AND ELECTRONIC APPARATUS

(71) Applicant: TENCENT TECHNOLOGY (SHENZHEN) COMPANY LIMITED, Shenzhen (CN)

(72) Inventor: Lin Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 100 days.

(21) Appl. No.: 16/460,805

(22) Filed: Jul. 2, 2019

(65) Prior Publication Data

US 2019/0325019 A1 Oct. 24, 2019

Related U.S. Application Data

(63) Continuation of application No. PCT/CN2018/082123, filed on Apr. 8, 2018.

(30) Foreign Application Priority Data

Apr. 20, 2017 (CN) .......................... 201710261933.X

(51) Int. Cl.
*G06F 40/205* (2020.01)
*G10L 15/08* (2006.01)
*G06F 40/295* (2020.01)

(52) U.S. Cl.
CPC .......... *G06F 40/205* (2020.01); *G06F 40/295* (2020.01); *G10L 15/083* (2013.01); *G10L 2015/088* (2013.01)

(58) Field of Classification Search
CPC ...... G06F 40/20; G06F 40/205; G06F 40/295; G06F 40/35; G06F 40/13
(Continued)

(56) References Cited

U.S. PATENT DOCUMENTS 7,031,910 B2 4/2006 Eisele
9,092,481 B2 * 7/2015 Digana ................ G06F 16/245
(Continued)

FOREIGN PATENT DOCUMENTS

CN 101840397 9/2010
CN 103365974 10/2013
(Continued)

OTHER PUBLICATIONS

International Search Report dated Jul. 11, 2018 in PCT/CN2018/082123 filed Apr. 8, 2018. (With English Translation).
(Continued)

*Primary Examiner* — Susan I McFadden
(74) *Attorney, Agent, or Firm* — Oblon, McClelland, Maier & Neustadt, L.L.P.

(57) ABSTRACT

A method, apparatus, and computer-readable storage medium for identifying a type of text information is provided. Target text information is received from a terminal by a server. The server obtains usage information of the terminal within a preset time period in which the target text information is received. Scenario information of the terminal is determined by the server based on the usage information. The usage information corresponds to a target scenario indicated by the scenario information. Further, a target type of the target text information is identified by the server. The target type is identified by the target scenario.

20 Claims, 5 Drawing Sheets

(58) Field of Classification Search
USPC ............................................................. 704/9
See application file for complete search history.

(56) References Cited

U.S. PATENT DOCUMENTS

| | | | |
|---|---|---|---|
| 9,760,601 B2* | 9/2017 | Burke | .............. G06Q 10/06398 |
| 10,108,607 B2* | 10/2018 | Song | ..................... G06F 40/205 |
| 2011/0106807 A1 | 5/2011 | Srihari et al. | |
| 2016/0154891 A1* | 6/2016 | Zhang | ................... G06F 40/169 |
| | | | 707/722 |

FOREIGN PATENT DOCUMENTS

| | | |
|---|---|---|
| CN | 103678404 | 3/2014 |
| CN | 106294308 A | 1/2017 |
| CN | 106407180 A | 2/2017 |

OTHER PUBLICATIONS

Written Opinion dated Jul. 11, 2018 in PCT/CN2018/082123 filed Apr. 8, 2018.
Chinese Office Action Issued in Application CN201710261933.X dated Dec. 3, 2020, with concise English translation, citing references AA and AO-AP therein (9 pages).

* cited by examiner

METHOD AND APPARATUS FOR IDENTIFYING TYPE OF TEXT INFORMATION, STORAGE MEDIUM, AND ELECTRONIC APPARATUS

RELATED APPLICATION

This application is a continuation of International Application No. PCT/CN2018/082123 filed on Apr. 8, 2018, which claims priority to Chinese Patent Application No. 201710261933.X, filed on Apr. 20, 2017, which are incorporated herein by reference in their entirety.

FIELD OF THE TECHNOLOGY

Embodiments of the present disclosure relate to the field of information identification, for example, identification of a type of text information.

BACKGROUND OF THE DISCLOSURE

Currently, text information is used for expressing an intention of a target object. During communication between target objects, a same sentence or a word may correspond to different types and have different meanings based on different situations, and a listener automatically performs judgment based on an environment in which the listener is located. However, it is difficult for a machine to identify a real meaning of a word expressed by a target object based on only content of text information. Identification of a text that is directly sent by a user and that may correspond to a plurality of types is relatively difficult, and a type in the plurality of types that corresponds to the text cannot be distinguished. Consequently, a subsequent service cannot be provided to the user based on the type of the text.

For the foregoing problem of difficult identification of a type of text information, an effective solution has not been currently provided.

SUMMARY

Embodiments of the present disclosure provide a method and an apparatus for identifying a type of text information, a non-transitory computer-readable storage medium, and an electronic apparatus, to resolve at least a technical problem of difficult identification of a type of text information in a related technology.

According to one aspect of the embodiments of the present disclosure, a method for identifying a type of text information is provided. Target text information is received from a terminal by a server. The server obtains usage information of the terminal within a preset time period in which the target text information is received. Scenario information of the terminal is determined by the server based on the usage information. The usage information corresponds to a target scenario indicated by the scenario information. Further, a target type of the target text information is identified by the server. The target type is identified by the target scenario.

According to another aspect of the embodiments of the present disclosure, an apparatus for identifying a type of text information is further provided. The apparatus includes processing circuitry. The processing circuitry is configured to receive target text information from a terminal and obtain usage information of the terminal within a preset time period in which the target text information is received. The processing circuitry is configured to determine scenario information of the terminal based on the usage information. The usage information corresponds to a target scenario indicated by the scenario information. Further, the processing circuitry is configured to identify a target type of the target text information that is identified by the target scenario.

According to another aspect of the embodiments of the present disclosure, a non-transitory computer-readable storage medium is further provided. The storage medium stores instructions which when executed by at least one processor cause the at least one processor to perform the method in the embodiments of the present disclosure when being run.

According to another aspect of the embodiments of the present disclosure, an electronic apparatus is further provided. The electronic apparatus includes a memory and a processor, the memory storing a computer program, and the processor being configured to perform the method in the embodiments of the present disclosure by using the computer program.

For example, in the embodiments of the present disclosure, the server obtains the target text information sent by the terminal at the first time, the target text information being text information whose type is to be determined; the server obtains the target running information of the terminal within the preset time period, the preset time period including the first time; the server determines the scenario information of the terminal based on the target running information, the target running information corresponding to the target scenario indicated by the scenario information; and the server identifies the target type that is of the target text information and that is in the target scenario. Because the current scenario information of the terminal is determined based on the running information of the terminal, and the type of the target text information is determined based on the scenario information, an objective to identify the target type that is of the target text information and that is in the target scenario is achieved, thereby achieving a technical effect of improving accuracy for identifying the type of the text information, and resolving the technical problem of the difficult identification of the type of the text information in the related technology.

BRIEF DESCRIPTION OF THE DRAWINGS

Accompanying drawings described herein are used for providing further understanding about the embodiments of the present disclosure, and constitute one portion of the present disclosure; and schematic embodiments of the present disclosure and their description are used for explaining the present disclosure, and are not intended to limit the present disclosure. In the figures.

DESCRIPTION OF EMBODIMENTS

To make a person skilled in the art understand the solutions in the present disclosure better, the following describes technical solutions in the embodiments of the present disclosure with reference to the accompanying drawings in the embodiments of the present disclosure. The described embodiments are merely exemplary and do not represent all of the embodiments of the present disclosure. All other embodiments obtained by a person of ordinary skill in the art based on the embodiments of the present disclosure shall fall within the protection scope of the present disclosure.

It should be noted that, the specification and claims of the present disclosure, and terms "first" and "second" in the foregoing accompanying drawings are used for distinguishing similar objects, but are not necessarily used to describe a specific sequence or order. It should be understood that, data used in this way is exchangeable in a proper case, so that the embodiments of the present disclosure that are described herein can be implemented in another order except those shown or described herein. Moreover, the terms "include", "contain" and any other variants mean to cover the non-exclusive inclusion. For example, a process, method, system, product, or device that includes a series of steps or units is not necessarily limited to those steps or units that are expressly listed, but may include other steps or units not expressly listed or inherent to such a process, method, product, or device.

According to one aspect of the embodiments of the present disclosure, an embodiment of a method for identifying a type of text information is provided.

Figure 1:
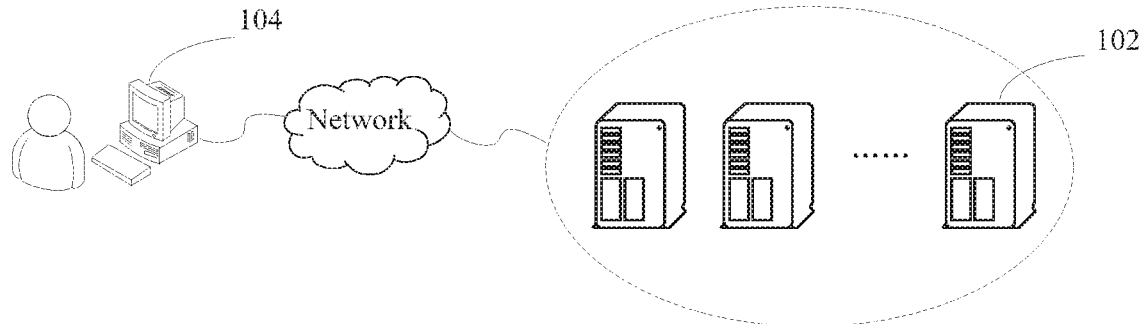
FIG. 1 is a schematic diagram of a hardware environment of a method for identifying a type of text information according to an embodiment of the present disclosure.

Optionally, in this embodiment, the method for identifying a type of text information may be applied to a hardware environment including a server 102 and a terminal 104 shown in FIG. 1. FIG. 1 is a schematic diagram of a hardware environment of a method for identifying a type of text information according to an embodiment of the present disclosure. As shown in FIG. 1, the server 102 is connected to the terminal 104 through a network. The network includes but is not limited to: a wide area network, a metropolitan area network, or a local area network, and the terminal 104 is not limited to a PC, a mobile phone, a tablet computer, or the like. The method for identifying a type of text information in this embodiment of the present disclosure may be performed by the server 102, or may be jointly performed by the server 102 and the terminal 104. The terminal 104 may alternatively perform the method for identifying a type of text information by using a client installed on the terminal 104.

Figure 2:
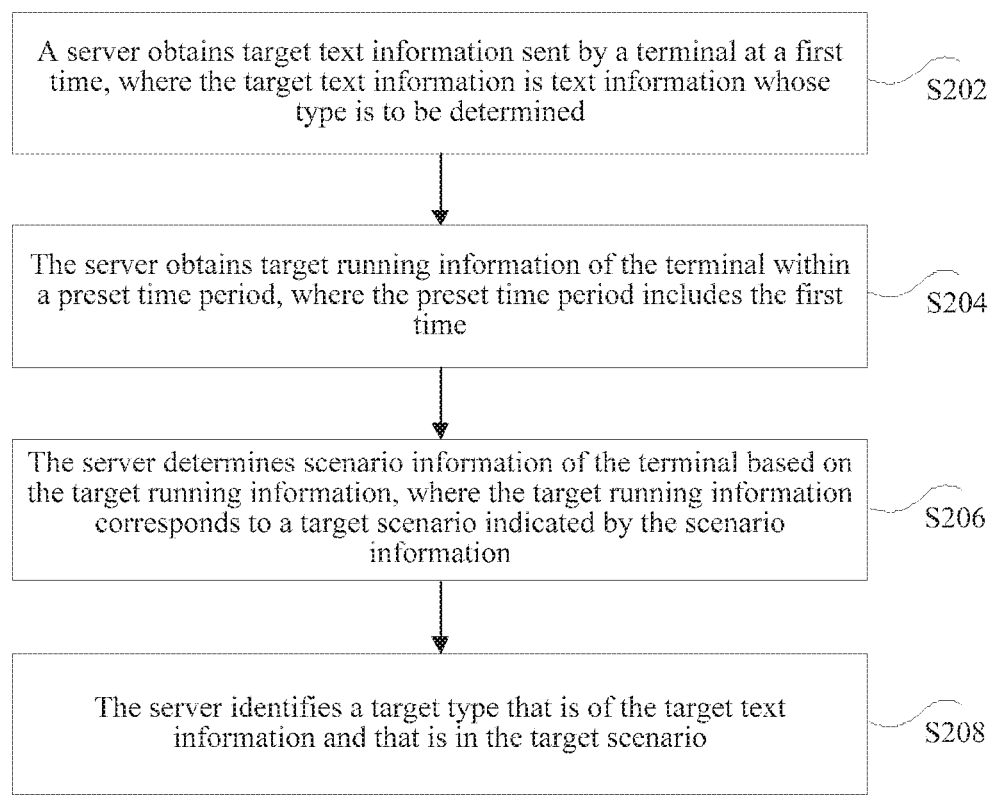
FIG. 2 is a flowchart of a method for identifying a type of text information according to an embodiment of the present disclosure.

FIG. 2 is a flowchart of a method for identifying a type of text information according to an embodiment of the present disclosure. As shown in FIG. 2, the method may include the following steps:

Step S202: A server receives, or otherwise obtains, target text information sent by a terminal at a first time. The target text information is text information whose type is to be determined.

In the technical solution provided in step S202 of this application, the text information is information that expresses an intention of a target object by using a character, and may include a word, a sentence, a paragraph, and the like. The target text information is the text information whose type is to be determined. The target text information may be text information that is input into the terminal by the target object when the terminal is in operation and that is sent by the terminal, or may be text information sent by the terminal after the terminal converts, into the text information, voice information input into the terminal by the target object when the terminal is run. The target object may be a user.

The type in this embodiment is used for classification of the text information, and may be a type of a speech material in artificial intelligence (AI), or may be a semantic type used for expressing an intention of the user in a particular scenario. For example, when the text information is "the Great Wall", the type of the text information may be an ancient architectural wonder appearing in a tourism web page, or may be a movie recommended in a movie and television web page. Optionally, the type may alternatively be a part of speech complying with a particular context. For example, when the text information is "propaganda", the type of the text information may be a verb type in a propaganda poster context, or may be a noun type in a propaganda poster context.

The to-be-determined type in this embodiment is the to-be-determined type of the text information. The target text information is the text information whose type is to be determined, in other words, the type of the target text information is to be determined. For example, if the terminal sends the target text information "the Great Wall" to the server at the first time, for the server, a type of the target text information "the Great Wall" is to be determined, and may be the Great Wall that means the ancient architectural wonder, or may be the Great Wall which represents the name of a movie.

The server obtains the target text information sent by the terminal at the first time, and the first time may be a current time. A plurality of types correspond to the target text information. For example, the target object inputs text information "I want to see the Great Wall". In this case, "the Great Wall" may correspond to "the Great Wall" that is the ancient architectural wonder, or may correspond to the movie "the Great Wall", an intention of the target object cannot be easily determined solely upon the input text information.

Optionally, the target text information sent at the first time by the terminal may be obtained by using the entity identification module.

Optionally, in AI, the target text information is a speech material, and then the type is a type of the speech material.

Step S204: The server obtains target running information (e.g., usage information) of the terminal within a preset time period, where the preset time period includes the first time.

In the technical solution provided in step S204 of this application, the running information of the terminal is information generated by the terminal during running of the terminal. After the server obtains the target text information sent by the terminal at the first time, the server obtains the target running information of the terminal within the preset time period, and may capture information about content displayed on a screen of the terminal. Information displayed on the screen of the terminal is usually information that the user can directly learn of when using the terminal, and is associated with a current scenario (e.g., usage scenario) of the terminal. Optionally, the target running information is the information displayed on the screen of the terminal, for example, a currently displayed web page, currently displayed chat information, a currently displayed picture, or currently displayed call information on the screen of the terminal. Optionally, the target running information is application (APP) information of an APP that is run, a history web page, history chat information, a history communication record, or the like.

The preset time period in this embodiment includes the first time. When the first time is the current time, the preset time period is the current time and a period of time closest to the current time, and then the target running information is current running information and latest running information of the terminal. For example, the closest period of time is a time from the current time to five minutes before the current time, or a time from the current time to two minutes before the current time.

Optionally, the preset time period is automatically set by the server, and the server may set the preset time period based on a word sequence of the target text information. For example, when a quantity of words in the word sequence of the received target text information is less than 5, the quantity of words in the word sequence is relatively few; and therefore more running information of the terminal needs to be obtained, to determine scenario information of the terminal, and the preset time period may be set to five minutes that is relatively long. For example, the target text information is "What about the Great Wall", and the word sequence thereof is {"What about", "the Great Wall"}. However, whether the target text information is for the Great Wall that is the ancient architectural wonder or the movie Great Wall, it cannot be determined, and target running information of the terminal within first five minutes may be obtained. When a quantity of words in the word sequence of the received target text information is greater than or equal to 5, the quantity of words in the word sequence is relatively many; and therefore a context is easier to be determined, scenario information of the terminal is determined by using relatively few running information of the terminal, and the preset time period may be set to two minutes that is relatively short. For example, the target text information is "What about the Great Wall that you watched last night", and the word sequence thereof is {"What about", "the Great Wall", "that", "you", "watched", "last night"}. It can be determined that this context is for asking about the movie, and target running information of the terminal within first two minutes may be obtained.

Optionally, the preset time period may alternatively be preset by the user. For example, to improve accuracy for determining the scenario information, the user sets the preset time period to 10 minutes.

It should be noted that, the foregoing only describes a technical solution of the present disclosure by using an example, and does not constitute a limitation on the present disclosure. This embodiment of the present disclosure may further include another manner of determining the preset time period. Examples are not provided one by one herein.

Step S206: The server determines scenario information (e.g., usage scenario information) of the terminal based on the target running information, where the target running information corresponds to a target scenario (e.g., target usage scenario) indicated by the scenario information.

In the technical solution provided in step S206 of this application, after the server obtains the target running information of the terminal within the preset time period, the server may determine the scenario information of the terminal based on the target running information, or may determine the scenario information of the terminal within the preset time period based on the target running information. Optionally, the scenario information corresponding to the target running information is selected from a plurality of pieces of scenario information based on a pre-stored correspondence between the running information of the terminal and the scenario information of the terminal. The target running information corresponds to a target scenario indicated by the scenario information. For example, the target running information is information about a movie-related APP that is run on the terminal, or a movie-related web page that is displayed on the terminal, and then the server selects movie scenario information of the terminal at a first time from a plurality of pieces of scenario information based on movie-related running information and a pre-stored correspondence between the movie-related running information and a movie scenario. For example, if the target running information is information about a movie comment application, and in addition, "What about this movie" is displayed on the screen of the terminal, it can be determined that the scenario information of the terminal is the movie scenario information.

Optionally, after the server obtains the target running information of the terminal within the preset time period, the server parses the captured target running information by using a user scenario parsing module, and obtains the scenario information of the terminal.

Step S208: The server identifies a target type of the target text information in the target scenario.

In the technical solution provided in step S208 of this application, the target type is a type of the target text information already identified in the target scenario, and may be a unique determined type.

After the server determines the scenario information of the terminal based on the target running information, the server identifies the target type of the target text information in the target scenario. Optionally, the entity identification module stores an entity list including types of different scenario information, or the different scenario information may alternatively be stored in the entity identification module in a form of a scenario list. The server queries, based on the target scenario information, for a target entity list corresponding to the target scenario information. Segmentation processing may be performed on the target text information. When separate words correspond to a plurality of types, matching is performed between a type of a separate word and the target entity list. When the type of the separate word is located in the target entity list, the separate word is classified as the type matched in the target entity list, and a target type of the target text information in the target scenario is obtained. The target type may be one of types such as an address, a name, and a style related to the target text information. In this way, a type of the target text information is adjusted to a type corresponding to a current scenario, thereby achieving an objective of identifying the target type of the target text information in the target scenario, and improving accuracy for identifying a type of text information.

For example, the target text information sent at the first time by the terminal is "I want to go to the Huaxia Starlight Cineplex to watch the X-Man", and the target entity list is "theater name, schedule, movie name, director name". A target type corresponding to "the Huaxia Starlight Cineplex" is identified to be the theater name in the target entity list, and a target type corresponding to "the X-Man" is identified to be the movie name in the target entity list.

Optionally, in AI identification, a type of text information is an entity of a speech material, and a type corresponding to a speech material is identified from speech materials of a user.

In step S202 to step S208, the server obtains the target text information sent by the terminal at the first time, where the target text information is text information whose type is to be determined; the server obtains the target running information of the terminal within the preset time period, where the preset time period includes the first time; the server determines the scenario information of the terminal based on the target running information, the target running information corresponding to the target scenario indicated by the scenario information; and the server identifies the target type of the target text information in the target scenario. Because the current scenario information of the terminal is determined based on the running information of the terminal, and the type of the target text information is determined based on the scenario information, improving accuracy for identifying the type of the text information, and resolving a technical problem of difficult identification of the type of the text information in the related technology.

In an optional implementation, step S208 of identifying, by the server, a target type of the target text information in the target scenario includes: performing segmentation processing on the target text information, to obtain a plurality of separate words; determining, by the server when a target separate word exists in the plurality of separate words, whether a first type corresponding to the target separate word exists in a preset type list, where the target separate word corresponds to a plurality of types including the first type, and the preset type list includes a type corresponding to the plurality of separate words in the target scenario; and determining, by the server after determining that the first type exists in the preset type list, the first type as the target type of the target separate word in the target scenario.

Figure 3:
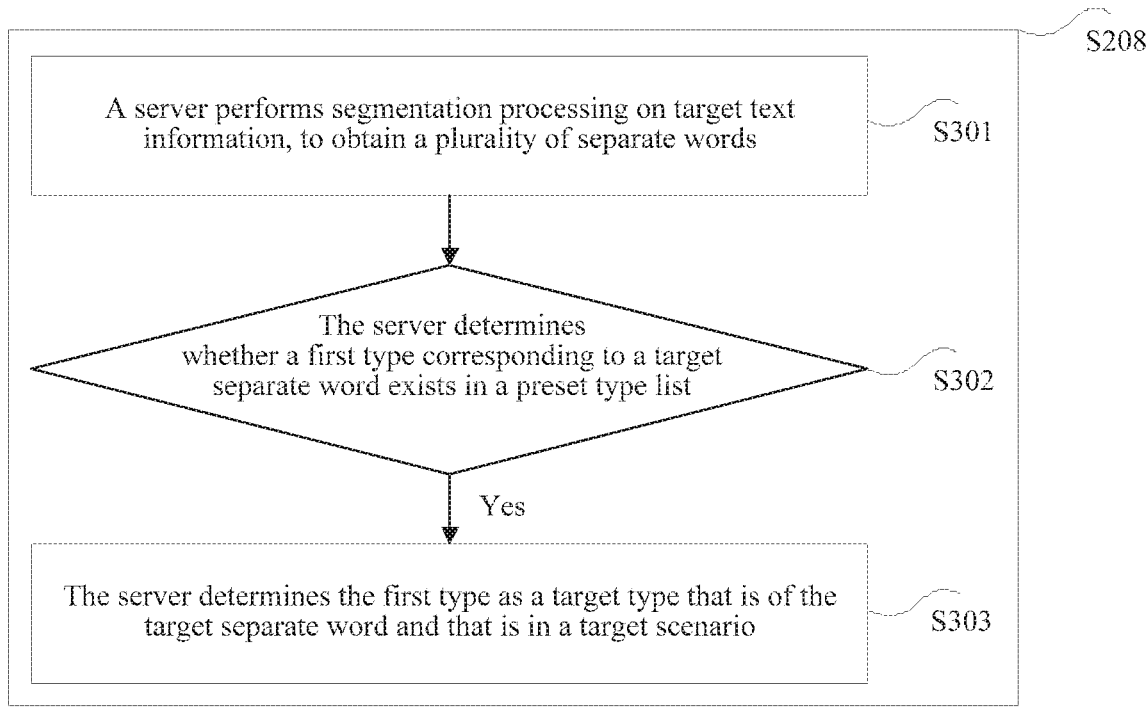
FIG. 3 is a flowchart of a method for identifying a target type of target text information in a target scenario according to an embodiment of the present disclosure.

FIG. 3 is a flowchart of a method for identifying a target type of target text information in a target scenario according to an embodiment of the present disclosure. As shown in FIG. 3, the method includes the following steps:

Step S301: A server performs segmentation processing on the target text information, to obtain a plurality of separate words.

In the technical solution provided in step S301 of this application, the target text information includes the plurality of separate words. After the server determines scenario information of a terminal based on target running information, the server identifies the target type of the target text information in the target scenario. When the server identifies the target type of the target text information in the target scenario, the server performs segmentation processing on the target text information, in other words, the server separates, based on a preset syntax, words included in the target text information, to obtain the plurality of separate words. For example, the target text information is "I want to see the Great Wall", and then segmentation processing is performed on "I want to see the Great Wall". Optionally, the preset syntax is a basic syntax. Performing segmentation processing on the target text information based on the basic syntax is performing segmentation processing on "I want to see the Great Wall" based on the basic syntax of a subject, a predicate, and an object, to obtain four separate words: "I", "want to", "see", and "the Great Wall", thereby improving accuracy for identifying the text information. By using the three separate words, namely, "I", "want to", and "see", an entity type and a meaning thereof can be determined without a doubt. However, an entity type corresponding to "the Great Wall" may be a scenic spot name, or may correspond to a movie name, or the like, and a type thereof cannot be directly determined to be the entity type, namely, the scenic spot name or the movie name.

Step S302: The server determines whether a first type corresponding to a target separate word exists in a preset type list.

In the technical solution provided in step S302 of this application, when the target separate word exists in the plurality of separate words, the server determines whether the first type corresponding to the target separate word exists in the preset type list. The target separate word corresponds to a plurality of types including the first type, and the preset type list includes types corresponding to a plurality of separate words in the target scenario. For example, the first type is a movie name, the target separate word "the Great Wall" corresponds to a plurality of types including the movie name, and the preset type list includes types corresponding to a plurality of separate words in a movie scenario.

The preset type list in this embodiment includes the types corresponding to the plurality of separate words, and the plurality of separate words are all separate words in the same target scenario. After the server performs segmentation processing on the target text information, to obtain the plurality of separate words, if the target separate word corresponding to the plurality of types exists in the plurality of separate words, the server determines whether the first type corresponding to the target separate word exists in the preset type list. The plurality of types include the first type, and the first type may be any one of the plurality of types. In AI, the preset type list is a preset entity list, and the preset entity list corresponds to the target scenario, and includes an entity related to the target scenario.

For example, a plurality of types corresponding to a separate word "the Great Wall" in the target text information includes a scenic spot name and a movie name, and whether the scenic spot name or the movie name exists in the preset type list is determined. The preset type list may include types such as theater name, schedule, movie name, and director name corresponding to the plurality of separate words in the movie scenario, and then a movie name type of "the Great Wall" is in a category of preset type. Then, it is determined that the first type "movie name" corresponding to the target separate word "the Great Wall" exists in the preset type list.

Step S303: The server determines the first type as the target type of the target separate word in the target scenario.

In the technical solution provided in step S303 of this application, after the server determines whether the first type corresponding to the target separate word exists in the preset type list, if determining that the first type exists in the preset type list, the server determines the first type as the target type of the target separate word in the target scenario.

For example, after the server determines whether a scenic spot name or a movie name exists in the preset type list, if determining that the first type "movie name" corresponding to the target separate word "the Great Wall" exists in the preset type list, the server determines the first type "movie name" as the target type of the target separate word "the Great Wall" in the movie scenario.

If the plurality of target separate words exist in the plurality of separate words, for the plurality of target separate words, the server separately determines, by using the foregoing method, a plurality of target types that are of the plurality of target separate words and that are in the target scenario, and adjust a type of the target text information to a target type corresponding to a current scenario, thereby improving accuracy for identifying the type of the target text information.

In this embodiment, the server performs segmentation processing on the target text information, to obtain a plurality of separate words; when a target separate word exists in the plurality of separate words, the server determines whether a first type corresponding to the target separate word exists in a preset type list, where the target separate word corresponds to a plurality of types including the first type, and the preset type list includes a type corresponding to the plurality of separate words in the target scenario; and if the server determines that the first type exists in the preset type list, the server determines the first type as the target type of the target separate word in the target scenario. In this way, an objective to identify the target type of the target text information in the target scenario is achieved, thereby improving the accuracy for identifying the type of the text information.

In an optional implementation, before step S302 of determining, by the server, whether a first type corresponding to a target separate word exists in a preset type list, the server determines, based on a first correspondence between the target scenario and the preset type list, the preset type list corresponding to the target scenario in a plurality of type lists.

Before the server determines whether the first type corresponding to the target separate word exists in the preset type list, the server obtains the preset type list. The preset type list corresponds to the target scenario indicated by target scenario information. Optionally, the plurality of type lists are pre-stored, and each type list corresponds to a different scenario, for example, a movie scenario, a food and drink scenario, a travel scenario, or a sightseeing scenario. The preset type list corresponding to the target scenario is determined in the plurality of type lists based on the first correspondence between the target scenario and the preset type list.

Optionally, scenario information carries a scenario identifier, the scenario identifier is used for indicating a scenario, the plurality of type lists are respectively identified by using a plurality of type list identifiers that have a correspondence with a preset scenario identifier, and the type list identifier is used for indicating a type list. There is the first correspondence between a target scenario identifier and a preset type list identifier. A preset type list identifier corresponding to the target scenario is determined in a plurality of type list identifiers based on the first correspondence. A pre-stored preset type list is invoked by using the preset type list identifier, thereby obtaining the preset type list.

In an optional implementation, step S206 of determining, by the server, scenario information of the terminal based on the target running information includes: determining, by the server based on a second correspondence between the target running information and the scenario information, the scenario information corresponding to the target running information in a plurality of pieces of preset scenario information.

In this embodiment, there is a correspondence between the running information of the terminal pre-stored on the server and the plurality of pieces of preset scenario information. Optionally, the terminal has the second correspondence between the target running information within a preset time period and the scenario information. When the server determines the scenario information of the terminal based on the target running information, the server determines, based on the second correspondence, the scenario information corresponding to the target running information in the plurality of pieces of preset scenario information.

In an optional implementation, step S204 of obtaining, by the server, target running information of the terminal within a preset time period includes: obtaining, by the server, current running information and history running information of the terminal, where the target running information includes the current running information and the history running information.

The target running information within the preset time period may be current running information of the terminal in a current running process and history running information of the terminal in a history running process. Optionally, the target running information is current display content and latest display content that are displayed on a screen of the terminal.

In an optional implementation, after step S208 of identifying, by the server, a target type of the target text information in the target scenario, the server sends, to the terminal based on the target type that is output, indication information used for instructing the terminal to perform a preset event.

Figure 4:
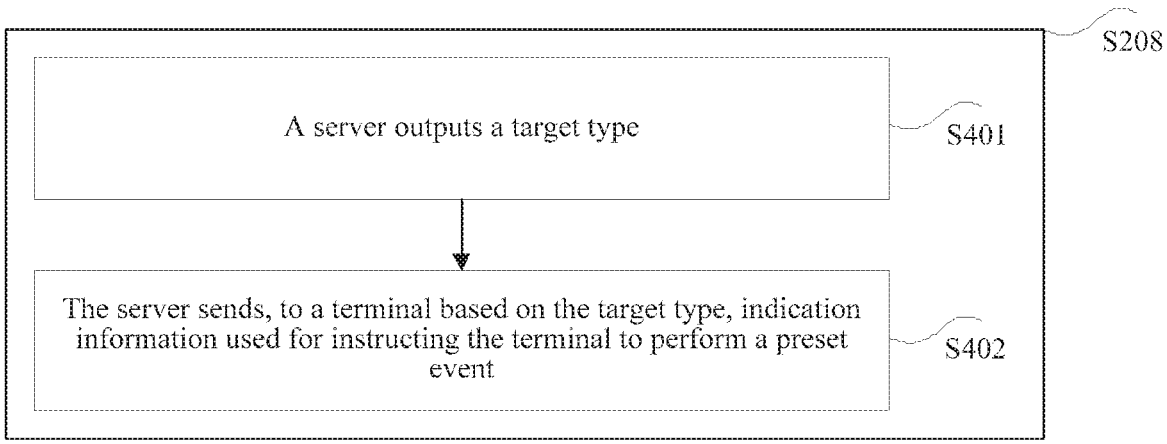
FIG. 4 is a flowchart of a method for identifying a type of text information according to an embodiment of the present disclosure.

FIG. 4 is a flowchart of a method for identifying a type of text information according to another embodiment of the present disclosure. As shown in FIG. 4, the method includes the following steps:

Step S401: A server outputs a target type.

In the technical solution provided in step S401 of this application, after the server identifies the target type of target text information in a target scenario, the server adjusts a type of the target text information to the target type corresponding to a current scenario, and outputs the target type, in other words, outputs an entity of a speech material. The server may output data to a terminal, or may output data to another server, to satisfy different services.

Step S402: The server sends, to a terminal based on the target type, indication information used for instructing the terminal to perform a preset event (e.g., process or service).

In the technical solution provided in step S402 of this application, after the server outputs the target type, the server sends, to the terminal based on the target type, the indication information used for instructing the terminal to perform the preset event, for example, pushes service indication information related to a target scenario to a user. The service indication information is used for instructing a target terminal to perform a process or service related to the target scenario, thereby leading the user to experience good service experience, and improving user experience.

In this embodiment, after outputting the target type of the target text information in the target scenario, the server outputs the target type, and sends, to the terminal based on the target type, the indication information used for instructing the terminal to perform the preset event, thereby helping provide a subsequent service to the user.

In an optional implementation, target running information includes at least one or more of the following: information about an APP run on the terminal; information about a character displayed on the terminal; information about a picture displayed on the terminal; information about a web page run on the terminal; information about a voice recorded on the terminal; and information about a chat on the terminal.

The information about an APP run on the terminal may be information about a video application, a chat application, an online shopping application, or the like run on the terminal.

The information about a character displayed on the terminal may be information that is about the character and that is displayed on a screen of the terminal, such as a font, a size, and a display location of the character. The information about a picture displayed on the terminal may be information that is about the picture and that is displayed on the screen of the terminal, such as a format, a color, a size, and a display location of the picture. The information about a web page run on the terminal may be information about a website run on the terminal, or a web page displayed on the terminal. The information about a voice recorded on the terminal may be a call record. The information about a chat on the terminal may be character chat information, voice chat information, or the like displayed in an interaction window. Optionally, a larger amount of target running information indicates higher accuracy for determining a scenario of the terminal, thereby improving accuracy for identifying a type of text information.

It should be noted that, the target running information in the foregoing embodiments are merely examples running information in embodiments of the present disclosure, and do not represent that the running information in this embodiment of the present disclosure is only the information about an APP run on the terminal, the information about a character displayed on the terminal, the information about a picture displayed on the terminal, the information about a web page run on the terminal, the information about a voice recorded on the terminal, and the information about a chat on the terminal. Any running information of the terminal that can be used for determining the scenario information of the terminal falls within the protection scope of the present disclosure. Details are not described herein.

The following describes technical solutions of the present disclosure with reference to exemplary implementations. Specifically, during AI identification, running information on the terminal and target text information sent by the user are both returned to a service end, the service end determines, based on content displayed on the screen, a scenario in which the user is located, and then automatically determines, based on the scenario, an entity type to which the target text information may correspond.

Figure 5:
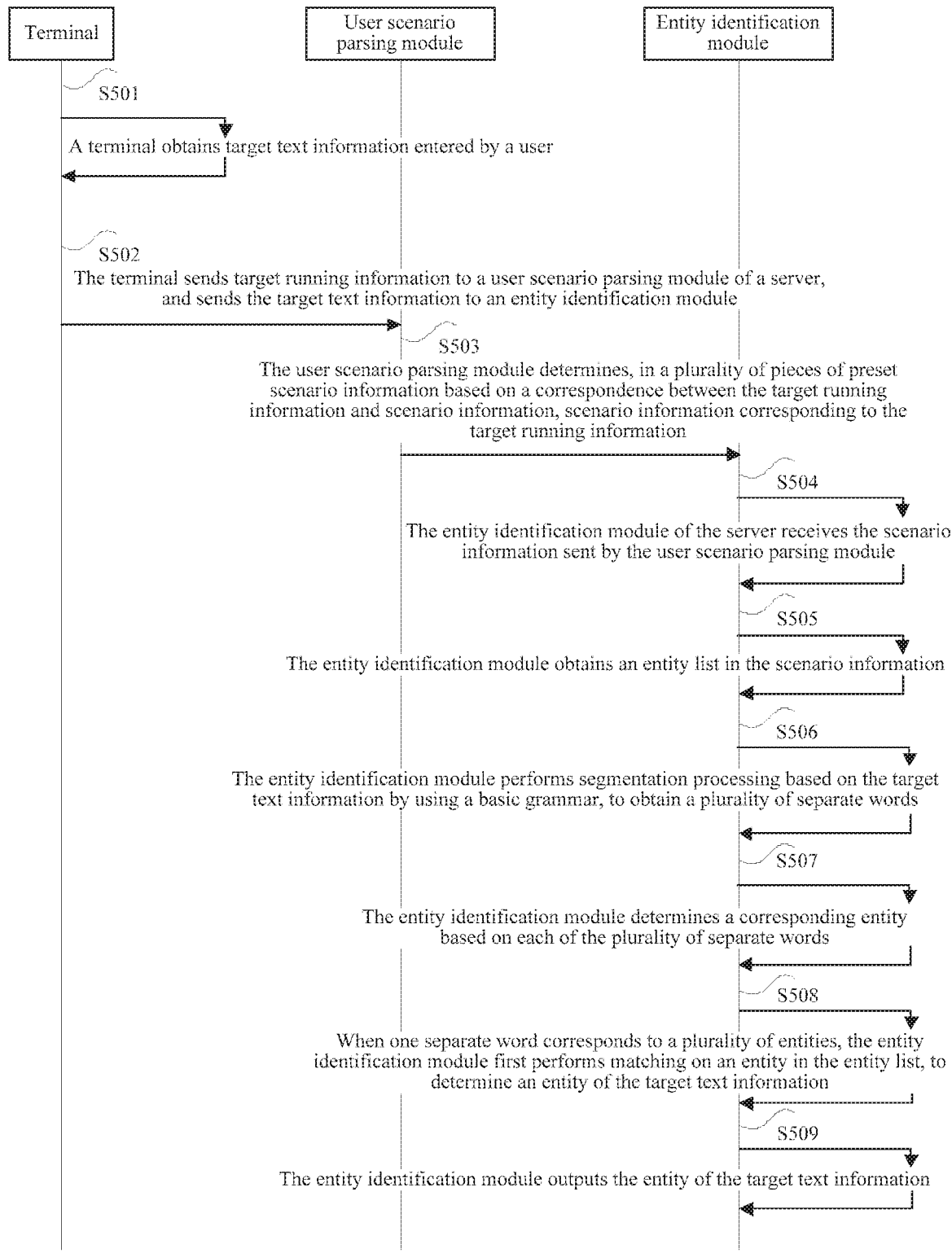
FIG. 5 is a schematic interaction diagram of a method for identifying a type of text information according to an embodiment of the present disclosure.

FIG. 5 is a schematic interaction diagram of a method for identifying a type of text information according to an embodiment of the present disclosure. As shown in FIG. 5, the method includes the following steps:

Step S501: A terminal obtains target text information entered by a user.

When using the terminal, the user enters the target text information into the terminal, and the terminal obtains the target text information. The target text information may be a speech material during AI identification. Optionally, the target text information may be character information entered by the user when the user browses a web page, chat information entered in a chat interaction window by the user, or the like. The target text information may alternatively be voice information, and the terminal converts the voice information into text information. For example, the target text information is "I want to watch a movie".

The terminal generates running information in a running process. The running information includes information about an APP run on the terminal, character displayed on a screen of the terminal, displayed chat content, a displayed picture, recorded call information, and the like.

Step S502: The terminal sends target running information to a user scenario parsing module of a server, and sends the target text information to an entity identification module.

After obtaining the target text information entered by the user, the terminal sends the target running information to the user scenario parsing module of the server, and sends the target text information to the entity identification module. The user scenario parsing module is a software module, and is configured to determine, in a plurality of pieces of preset scenario information based on a correspondence between the target running information and scenario information, scenario information corresponding to the target running information.

Step S503: The user scenario parsing module determines, in a plurality of pieces of preset scenario information based on a correspondence between the target running information and scenario information, scenario information corresponding to the target running information.

The user scenario parsing module receives the target running information sent by the terminal, in other words, captures the target running information. Optionally, the user scenario parsing module captures information displayed on the screen of the terminal. The user scenario parsing module determines, in the plurality of pieces of preset scenario information based on the correspondence between the target running information and the scenario information, the scenario information corresponding to the target running information, and sends the scenario information corresponding to the target running information to the entity identification module.

Optionally, the target running information includes a movie comment APP that is run, and further includes the character displayed on the screen of the terminal. The character includes characters "What about this movie". In this way, it can be determined, by comprehensively using the movie comment APP and the characters "What about this movie", that a current usage scenario of the terminal is a movie scenario.

Step S504: The entity identification module of the server receives the scenario information sent by the user scenario parsing module.

The entity identification module of the server receives the scenario information sent by the user scenario parsing module. The entity identification module may store a scenario list including a plurality of pieces of scenario information. Different scenario information in the scenario list corresponds to different entity lists, and is stored in the entity identification module. The entity identification module further stores a correspondence between scenario information and an entity list.

Step S505: The entity identification module obtains an entity list in the scenario information.

After the entity identification module receives the scenario information sent by the user scenario parsing module, the entity identification module selects the entity list in the scenario information from a plurality of entity lists based on the scenario information and the correspondence between the scenario information and the entity list.

Step S506: The entity identification module performs segmentation processing based on the target text information by using a basic syntax, to obtain a plurality of separate words.

After the entity identification module obtains the entity list in the scenario information, the entity identification module performs segmentation processing on the target text information, and performs segmentation processing based on the target text information by using the basic syntax, to obtain the plurality of separate words, for example, performs segmentation processing on target information "I want to see the Great Wall" based on a subject, a predicate, and an object, to obtain four separate words, namely, "I", "want to", "see", and "the Great Wall".

Step S507: The entity identification module determines a corresponding entity based on each of the plurality of separate words.

After the entity identification module performs segmentation processing based on the target text information by using the basic syntax, to obtain the plurality of separate words, the entity identification module determines the corresponding entity based on each of the plurality of separate words. For example, the entity identification module determines entities corresponding to four separate words, namely, "I", "want to", "see", and "the Great Wall". Entity types and meanings of the three separate words, namely, "I", "want to", "see", can be determined without a doubt. However, an entity type corresponding to "the Great Wall" may be a scenic spot name, or may be a corresponding movie name, or the like. The entity type thereof, namely, the scenic spot name or the movie name, cannot be directly determined.

Step S508: When one separate word corresponds to a plurality of entities, the entity identification module first performs matching on an entity in the entity list, to determine an entity of the target text information.

After the entity identification module determines the corresponding entity based on each of the plurality of separate words, when one separate word corresponds to a plurality of entities, the entity identification module first performs matching on the entity list that is in the scenario information and that is obtained by the entity identification module in step S505, to determine an entity of the separate word, and obtains the entity of the entire target text information after determining the entity of the separate word.

Step S509: The entity identification module outputs the entity of the target text information.

After the entity identification module determines the entity of the target text information, the entity identification module outputs the entity of the target text information, and a subsequent service is conveniently provided to the user, improving user experience.

For example, the user sends the target text information "I want to see the Great Wall" by using the terminal, obtains the target information "I want to see the Great Wall" and the content displayed on the screen of the terminal, and analyzes the content displayed on the screen. A movie-related APP is run on the terminal, and movie-related content, such as "What about this movie", is displayed on the terminal, so that it is determined, by comprehensively using the movie-related APP and the movie-related content that is displayed, that the terminal is currently run in the movie scenario. An entity list related to a movie scenario is queried for among the plurality of entity lists based on a correspondence between a movie scenario and an entity list. The entity list includes a plurality of entities, such as a theater name, a schedule, a movie name, and a director name. In addition, segmentation is performed on the target information "I want to see the Great Wall", to obtain four separate words, namely, "I", "want to", "see", and "the Great Wall". Types of the three separate words, namely, "I", "want to", "see", can be determined without a doubt. However, "the Great Wall" may correspond to a scenic spot name, or may correspond to a movie name, or the like. Entity selection is performed in the found entity list corresponding to the scenario, and the movie name is found in the entity list that is found based on the scenario. Therefore, "the Great Wall" is categorized as the movie name. In this way, a type of "I want to see the Great Wall" is determined as "I want to watch the movie the Great Wall".

In this embodiment, the terminal obtains the target text information entered by the user; the terminal sends the target running information to the user scenario parsing module of the server, and sends the target text information to the entity identification module; the user scenario parsing module of the server determines, in the plurality of pieces of preset scenario information based on the correspondence between the target running information and the scenario information, the scenario information corresponding to the target running information; the entity identification module receives the scenario information sent by the user scenario parsing module; the entity identification module obtains the entity list in the scenario information; the entity identification module performs segmentation processing based on the target text information by using the basic syntax, to obtain the plurality of separate words; the entity identification module determines the corresponding entity based on each of the plurality of separate words; when the one separate word corresponds to the plurality of entities, the entity identification module first performs matching on the entity in the entity list, to determine the entity of the target text information; and the entity identification module outputs the entity of the target text information, thereby improving accuracy for identifying the type of the target text information, conveniently providing the subsequent service to the user, and improving user experience.

It should be noted that, for ease of description, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, the person skilled in the art should also understand that the embodiments described in this specification are exemplary embodiments, and the involved actions and modules are not necessarily mandatory to the present disclosure.

Based on the foregoing descriptions of the embodiments, the person skilled in the art may understand that the method in the foregoing embodiments may be implemented by software in addition to a necessary universal hardware platform or by hardware only. However, the former is a better implementation in most cases. Based on such an understanding, the technical solutions of the present disclosure or the part that makes contributions to the related technology may be substantially embodied in the form of a software product. The computer software product is stored in a storage medium (for example, non-transitory computer-readable storage medium such as a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present disclosure.

According to another aspect of the embodiments of the present disclosure, an apparatus that is for identifying a type of text information and that is configured to implement the foregoing method for identifying a type of text information. The apparatus includes processing circuitry such as one or more processors, and one or more memories storing a program unit. The program unit is executed by the processors, and the program unit may include: a first obtaining unit, a second obtaining unit, a determining unit, and an identification unit.

Figure 6:
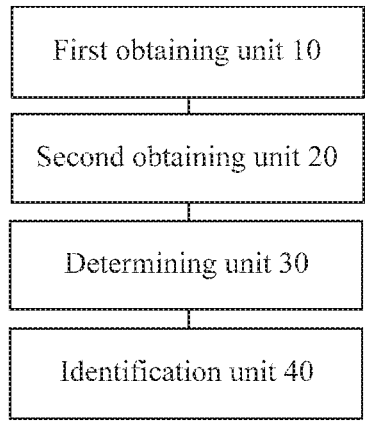
FIG. 6 is a schematic diagram of an apparatus for identifying a type of text information according to an embodiment of the present disclosure.

FIG. 6 is a schematic diagram of an apparatus for identifying a type of text information according to an embodiment of the present disclosure. As shown in FIG. 6, the apparatus may include: a first obtaining unit 10, a second obtaining unit 20, a determining unit 30, and an identification unit 40.

The first obtaining unit 10 is configured to enable a server to obtain target text information sent by a terminal at a first time, where the target text information is text information whose type is to be determined.

The first obtaining unit 10 enables the server to obtain the target text information sent by the terminal at the first time, and the first time may be a current time. The target text information corresponds to a plurality of types. The text information is information that expresses an intention of a target object by using a character, and includes a word, a sentence, a paragraph, and the like. The target text information is the text information whose type is to be determined. The target text information may be text information that is input into the terminal by the target object when the terminal is run and that is sent by the terminal, or may be text information sent by the terminal after the terminal converts, into the text information, voice information input into the terminal by the target object when the terminal is run. The target object may be a user.

The second obtaining unit 20 is configured to enable the server to obtain target running information of the terminal within a preset time period, where the preset time period includes the first time.

The running information of the terminal is information generated by the terminal during running of the terminal. After the first obtaining unit 10 enables the server to obtain the target text information sent by the terminal at the first time, the second obtaining unit 20 enables the server to obtain the target running information of the terminal within the preset time period. The second obtaining unit 20 may enable the server to capture information about content displayed on a screen of the terminal. Information displayed on the screen of the terminal is usually information that the user can directly learn of when using the terminal, and is associated with a current scenario of the terminal. Optionally, the target running information is the information displayed on the screen of the terminal, for example, a currently displayed web page, currently displayed chat information, a currently displayed picture, or currently displayed call information on the screen of the terminal. Optionally, the target running information that the second obtaining unit 20 enables the server to obtain is information about an APP that is run, a history web page, history chat information, a history communication record, or the like.

The determining unit 30 is configured to enable the server to determine scenario information of the terminal based on the target running information, the target running information corresponding to a target scenario indicated by the scenario information.

After the second obtaining unit 20 enables the server to obtain the target running information of the terminal within the preset time period, the determining unit 30 enables the server to determine the scenario information of the terminal based on the target running information. Optionally, the determining unit 30 enables the server to select the scenario information corresponding to the target running information from a plurality of pieces of scenario information based on a pre-stored correspondence between the running information of the terminal and the scenario information of the terminal. The target running information corresponds to a target scenario indicated by the scenario information. For example, the target running information is information about a movie-related APP that is run on the terminal, or a movie-related web page that is displayed on the terminal, and then the determining unit 30 enables the server to select movie scenario information of the terminal at a first time from a plurality of pieces of scenario information based on a pre-stored correspondence between movie-related running information and a movie scenario. For example, if the target running information is information about a movie comment APP, and in addition, "What about this movie" is displayed on the screen of the terminal, the determining unit 30 can enable the server to determine that the scenario information of the terminal is the movie scenario information.

Optionally, after the second obtaining unit 20 enables the server to obtain the target running information of the terminal within the preset time period, the determining unit 30 enables the server to parse the captured target running information by using a user scenario parsing module, and obtain the scenario information of the terminal.

The identification unit 40 is configured to enable the server to identify a target type of the target text information in the target scenario.

After the determining unit 30 enables the server to determine the scenario information of the terminal based on the target running information, the identification unit 40 enables the server to identify the target type of the target text information in the target scenario. Optionally, the identification unit 40 enables the server to store entity lists corresponding to different scenario information, or the different scenario information may be stored in the entity identification module in a form of a scenario list. A target entity list corresponding to the target scenario information is queried for based on the target scenario information. The identification unit 40 enables the server to perform segmentation processing on the target text information. When separate words correspond to a plurality of types, the identification unit 40 enables the server to perform matching on the target entity list based on the separate words. When the type of the separate word is located in the target entity list, the identification unit 40 enables the server to classify the separate word as the type in the target entity list, to obtain a target type of the target text information in the target scenario. The target type may be one of types such as an address, a name, and a style related to the target text information. In this way, a type of the target text information is adjusted to a type corresponding to a current scenario, thereby achieving an objective of identifying the target type of the target text information in the target scenario, and improving accuracy for identifying a type of text information.

Herein, it should be noted that, the first obtaining unit 10, the second obtaining unit 20, the determining unit 30, and the identification unit 40 may be run, as a part of the apparatus, in the terminal. The functions implemented by the foregoing units may be performed by using a processor or other circuitry in the terminal. The terminal may alternatively be a terminal device such as a smartphone (such as an Android mobile phone or an iOS mobile phone), a tablet computer, a palmtop computer, a mobile Internet device (MID), or a PAD.

Figure 7:
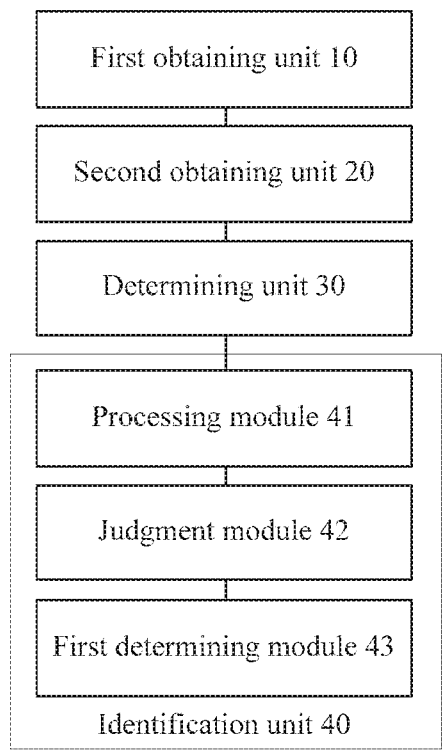
FIG. 7 is a schematic diagram of an apparatus for identifying a type of text information according to an embodiment of the present disclosure.

FIG. 7 is a schematic diagram of an apparatus for identifying a type of text information according to another embodiment of the present disclosure. As shown in FIG. 7, the apparatus may include: a first obtaining unit 10, a second obtaining unit 20, a determining unit 30, and an identification unit 40. The identification unit 40 includes: a processing module 41, a judgment module 42, and a first determining module 43.

It should be noted that, the first obtaining unit 10, the second obtaining unit 20, the determining unit 30, and the identification unit 40 in this embodiment have the functions that are the same as those of the apparatus for identifying a type of text information shown in FIG. 6. Details are not described herein again.

The processing module 41 is configured to enable the server to perform segmentation processing on the target text information, to obtain a plurality of separate words.

The target text information includes the plurality of separate words. After the determining unit 30 enables the server to determine the scenario information of the terminal based on the target running information, the identification unit 40 enables the server to identify the target type of the target text information in the target scenario. When the identification unit 40 enables the server to identify the target type of the target text information in the target scenario, the processing module 41 enables the server to perform segmentation processing on the target text information, in other words, the processing module 41 enables the server to separate, based on a preset syntax, words included in the target text information, to obtain the plurality of separate words. For example, the target text information is "I want to see the Great Wall", and then segmentation processing is performed on "I want to see the Great Wall". Optionally, the preset syntax is a basic syntax. Performing segmentation processing on the target text information based on the basic syntax is performing segmentation processing on "I want to see the Great Wall" based on a subject, a predicate, and an object, to obtain four separate words: "I", "want to", "see", and "the Great Wall", thereby improving accuracy for identifying the text information.

The judgment module 42 is configured to enable the server to determine, when a target separate word exists in the plurality of separate words, whether a first type corresponding to the target separate word exists in a preset type list, where the target separate word corresponds to a plurality of types including the first type, and the preset type list includes a type corresponding to the plurality of separate words in the target scenario.

After the processing module 41 enables the server to perform segmentation processing on the target text information, to obtain the plurality of separate words, if the target separate word exists in the plurality of separate words, the judgment module 42 enables the server to determine whether the first type corresponding to the target separate word exists in the preset type list. The target separate word corresponds to a plurality of types including the first type, and the preset type list includes a type corresponding to the plurality of separate words in the target scenario. In AI, the preset type list is a preset entity list, and the preset entity list corresponds to the target scenario, and includes an entity related to the target scenario.

The first determining module 43 is configured to enable the server to determine, after determining that the first type exists in the preset type list, the first type as the target type of the target separate word in the target scenario.

After the judgment module 42 enables the server to determine whether the first type corresponding to the target separate word exists in the preset type list, if the judgment module 42 enables the server to determine that the first type corresponding to the target separate word exists in the preset type list, the first determining module 43 enables the server to determine the first type as the target type of the target separate word in the target scenario.

Herein, it should be noted that, the processing module 41, the judgment module 42, and the first determining module 43 may be run, as a part of the apparatus, in the terminal. The functions implemented by the foregoing modules may be performed by using a processor in the terminal.

Figure 8:
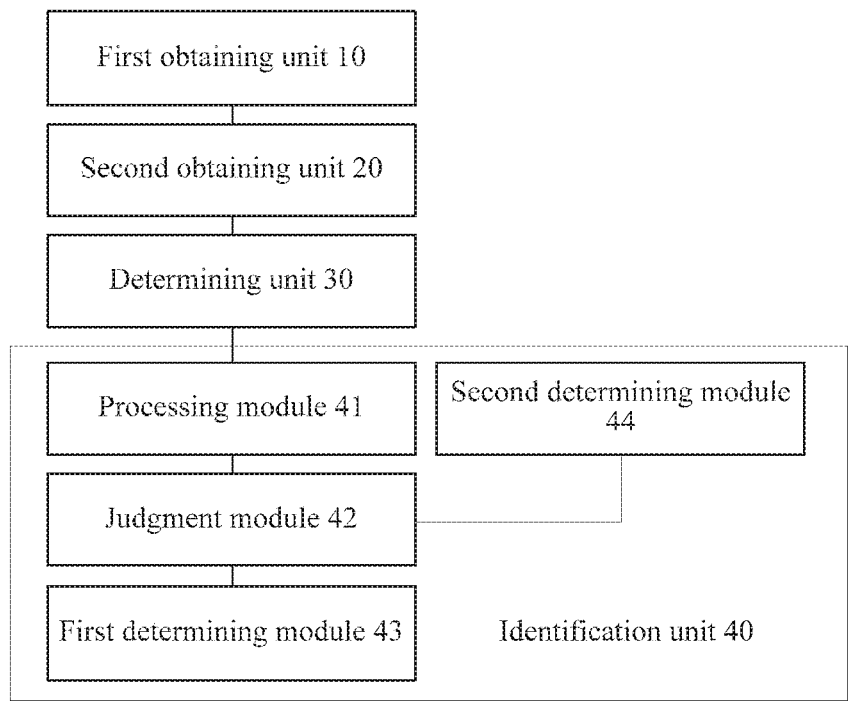
FIG. 8 is a schematic diagram of an apparatus for identifying a type of text information according to an embodiment of the present disclosure.

FIG. 8 is a schematic diagram of an apparatus for identifying a type of text information according to another embodiment of the present disclosure. As shown in FIG. 8, the apparatus may include: a first obtaining unit 10, a second obtaining unit 20, a determining unit 30, and an identification unit 40. The identification unit 40 includes: a processing module 41, a judgment module 42, and a first determining module 43. The identification unit 40 further includes a second determining module 44.

It should be noted that, the first obtaining unit 10, the second obtaining unit 20, the determining unit 30, the identification unit 40, the processing module 41, the judgment module 42, and the first determining module 43 in this embodiment have the functions that are the same as those of the apparatus for identifying a type of text information shown in FIG. 7. Details are not described herein again.

The second determining module 44 is configured to enable the server to determine, before determining whether the first type corresponding to the target separate word exists in the preset type list, based on a first correspondence between the target scenario and the preset type list, the preset type list corresponding to the target scenario in a plurality of type lists.

Before the judgment module 42 enables the server to determine whether the first type corresponding to the target separate word exists in the preset type list, the second determining module 44 enables the server to obtain the preset type list. The preset type list corresponds to the target scenario indicated by target scenario information. Optionally, a plurality of type lists are pre-stored, and each type list corresponds to a different scenario, for example, a movie scenario, a food and drink scenario, a travel scenario, or a sightseeing scenario. The second determining module 44 enables the server to determine, based on a first correspondence between the target scenario and the preset type list, the preset type list corresponding to the target scenario in a plurality of type lists.

Optionally, scenario information carries a scenario identifier, the scenario identifier is used for indicating a scenario, the plurality of type lists are respectively identified by using a plurality of type list identifiers that have a correspondence with a preset scenario identifier, and the type list identifier is used for indicating a type list. There is the first correspondence between a target scenario identifier and a preset type list identifier. The second determining module 44 enables the server to determine a preset type list identifier corresponding to the target scenario in a plurality of type list identifiers based on the first correspondence. A pre-stored preset type list is invoked by using the preset type list identifier, thereby obtaining the preset type list.

Herein, it should be noted that, the second determining module 44 may be a part of the apparatus, in the terminal. The functions implemented by the foregoing modules may be performed by using a processor in the terminal.

Optionally, the apparatus further includes a third determining module, configured to enable the server to determine, based on a second correspondence between the target running information and the scenario information, the scenario information corresponding to the target running information in a plurality of pieces of preset scenario information.

A correspondence between the running information of the terminal and the plurality of pieces of preset scenario information is pre-stored. The terminal has the second correspondence between the target running information within a preset time period and the scenario information. When the determining unit 30 enables the server to determine the scenario information of the terminal based on the target running information, the third determining module determines, based on the second correspondence, the scenario information corresponding to the target running information in the plurality of pieces of preset scenario information.

Herein, it should be noted that, the third determining module may be run, as a part of the apparatus, in the terminal. The functions implemented by the foregoing modules may be performed by using a processor in the terminal.

Optionally, the second obtaining unit 20 includes an obtaining module, configured to enable the server to obtain current running information and history running information of the terminal, where the target running information includes the current running information and the history running information.

The target running information within the preset time period may be running information of the terminal in a current running process and running information of the terminal in a history running process. Optionally, the target running information is current display content and latest display content that are displayed on a screen of the terminal.

Herein, it should be noted that, the obtaining module may be run, as a part of the apparatus, in the terminal. The functions implemented by the foregoing modules may be performed by using a processor in the terminal.

Optionally, the apparatus further includes: an output unit and a sending unit. The output unit is configured to enable the server to output the target type after identifying the target type of the target text information in the target scenario. The sending unit is configured to enable the server to send, to the terminal based on the target type, indication information used for instructing the terminal to perform a preset event.

After enabling the server to identify the target type of target text information in a target scenario, the identification unit 40 adjusts a type of the target text information to the target type corresponding to a current scenario, and the output unit outputs the target type, in other words, outputs an entity of a speech material. The output unit may output data to a terminal, or may output data to another server, to satisfy different services.

After the output unit outputs the target type, the sending unit sends, to the terminal based on the target type, the indication information used for instructing the terminal to perform the preset event, for example, pushes service indication information related to a target scenario to a user. The service indication information is used for instructing a target terminal to perform a service related to the target scenario, thereby leading the user to experience good service experience, and improving user experience.

Herein, it should be noted that, the output unit and the sending unit may be run, as a part of the apparatus, in the terminal. The functions implemented by the foregoing modules may be performed by using a processor in the terminal.

In an optional implementation, target running information includes at least one or more of the following: information about an APP run on the terminal; information about a character displayed on the terminal; information about a picture displayed on the terminal; information about a web page run on the terminal; information about a voice recorded on the terminal; and information about a chat on the terminal.

The information about an APP run on the terminal may be information about a video APP, a chat application, an online shopping APP, or the like run on the terminal. The information about a character displayed on the terminal may be information that is about the character and that is displayed on a screen of the terminal, such as a font, a size, and a display location of the character. The information about a picture displayed on the terminal may be information that is about the picture and that is displayed on the screen of the terminal, such as a format, a color, a size, and a display location of the picture. The information about a web page run on the terminal may be information about a website run on the terminal, or a web page displayed on the terminal. The information about a voice recorded on the terminal may be a call record. The information about a chat on the terminal may be character chat information, voice chat information, or the like displayed in an interaction window. Optionally, a larger amount of target running information indicates higher accuracy for determining a scenario of the terminal, thereby improving accuracy for identifying a type of text information.

It should be noted that, the first obtaining unit 10 in this embodiment may be configured to perform step S202 in the embodiments of this application, the second obtaining unit 20 in this embodiment may be configured to perform step S204 in the embodiments of this application, the determining unit 30 in this embodiment may be configured to perform step S206 in the embodiments of this application, and the identification unit 40 in this embodiment may be configured to perform step S208 in the embodiments of this application.

In this embodiment, the first obtaining unit 10 enables the server to obtain the target text information sent by the terminal at the first time, where the target text information is text information whose type is to be determined; the second obtaining unit 20 enables the server to obtain the target running information of the terminal within the preset time period, where the preset time period includes the first time; the determining unit 30 enables the server to determine the scenario information of the terminal based on the target running information, where the target running information corresponds to the target scenario indicated by the scenario information; and the identification unit 40 enables the server to identify the target type of the target text information in the target scenario. Because the current scenario information of the terminal is determined based on the running information of the terminal, and the type of the target text information is determined based on the scenario information, improving accuracy for identifying the type of the text information, and resolving a technical problem of difficult identification of the type of the text information in the related technology.

It should be noted herein that, examples and application scenarios implemented by the foregoing units and modules and the corresponding steps are the same, but are not limited to the content disclosed in the foregoing embodiments. It should be noted that the foregoing modules may be run in the hardware environment shown in FIG. 1 as a part of the apparatus, and may be implemented through software, or may be implemented through hardware. The hardware environment includes a network environment.

According to still another aspect of the embodiments of the present disclosure, an electronic apparatus for identifying a type of text information is further provided.

Figure 9:
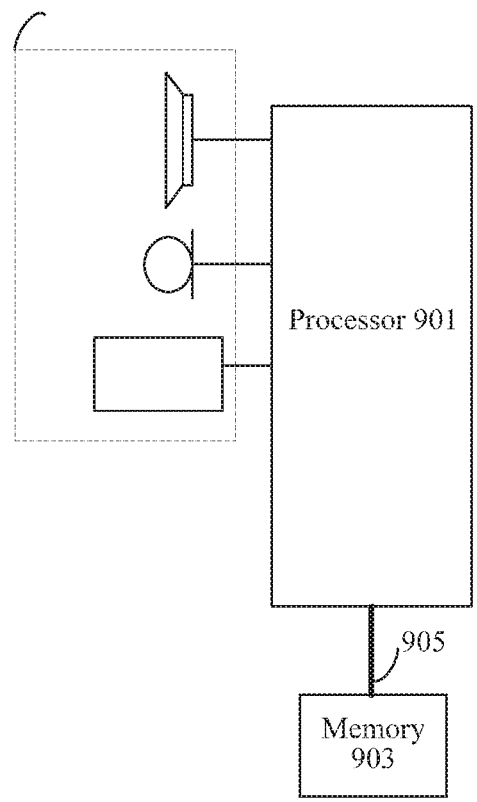
FIG. 9 is a schematic block diagram of an electronic apparatus according to an embodiment of the present disclosure.

FIG. 9 is a schematic block diagram of an electronic apparatus according to an embodiment of the present disclosure. As shown in FIG. 9, the electronic apparatus may include: processing circuitry such as one or more processors 901 (where, only one is shown in the figure), a memory 903, and a transmission apparatus 905 (e.g., communication line). As shown in FIG. 9, the electronic apparatus may further include an input/output device 907.

The memory 903 may be configured to store a computer program and a module, for example, a program instruction/module corresponding to the method and the apparatus for identifying a type of text information in the embodiments of the present disclosure. The processor 901 is configured to run a software program and a module that are stored in the memory 903 to execute various functional applications and perform data processing, that is, implement the foregoing method for identifying a type of text information. The memory 903 may include a high-speed random memory, and may also include a nonvolatile memory such as one or more magnetic storage apparatuses, a flash memory, or another nonvolatile solid-state memory. In some embodiments, the memory 903 may further include memories remotely disposed relative to the processor 901, and these remote memories may be connected to the terminal through a network. Examples of the network include, but are not limited to, the Internet, an intranet, a local area network, a mobile communications network, and a combination thereof.

The transmission apparatus 905 is configured to receive or send data via a network and may further be configured to transmit data of the processor 901 and the memory 903. Specific examples of the foregoing network may include a wired network and a wireless network. In an embodiment, the transmission apparatus 905 includes a network interface controller (NIC) that may be connected to another network device and a router by using a network cable, thereby communicating with the Internet or a local area network. In an embodiment, the transmission apparatus 905 is a radio frequency (RF) module that is configured to communicate with the Internet in a wireless manner.

Optionally, the memory 903 is configured to store an application program.

The processor 901 is configured to run the program. When the program is run, the method for identifying a type of text information in the present disclosure is performed. The processor 901 may invoke, by using the transmission apparatus 905, the application program stored in the memory 903, to perform the following steps:

enabling a server to obtain target text information sent by a terminal at a first time, where the target text information is text information whose type is to be determined;

enabling the server to obtain target running information of the terminal within a preset time period, where the preset time period includes the first time;

enabling the server to determine scenario information of the terminal based on the target running information, where the target running information corresponds to a target scenario indicated by the scenario information; and enabling the server to identify a target type of the target text information in the target scenario.

The target text information in this embodiment may be text information that is input into the terminal by a user when the terminal is run and that is sent by the terminal, or may be text information sent by the terminal after the terminal converts, into the text information, voice information input into the terminal by a user when the terminal is run.

The processor 901 may use the input/output device 907 to enable the server to obtain the target text information sent by the terminal at the first time, and the first time may be a current time. The target text information corresponds to a plurality of types.

After the processor 901 enables the server to obtain the target text information sent by the terminal at the first time, the processor 901 enables the server to obtain the target running information of the terminal within the preset time period.

The running information of the terminal is information generated by the terminal during running of the terminal. After the processor 901 enables the server to obtain the target text information sent by the terminal at the first time, the processor 901 enables the server to obtain the target running information of the terminal within the preset time period. The processor 901 may enable the server to use the input/output device 907 to capture information about content displayed on a screen of the terminal. Information displayed on the screen of the terminal is usually information that the user can directly learn of when using the terminal, and is associated with a current scenario of the terminal. Optionally, the target running information is the information displayed on the screen of the terminal, for example, a currently displayed web page, currently displayed chat information, a currently displayed picture, or currently displayed call information on the screen of the terminal. Optionally, the target running information is information about an APP that is run, a history web page, history chat information, a history communication record, or the like.

Optionally, the processor 901 enables the server to select the scenario information corresponding to the target running information from a plurality of pieces of scenario information based on a pre-stored correspondence between the running information of the terminal and the scenario information of the terminal. The target running information corresponds to a target scenario indicated by the scenario information. For example, the target running information is information about a movie-related APP that is run on the terminal, or a movie-related web page that is displayed on the terminal, and then the processor 901 enables the server to select movie scenario information of the terminal at a first time from a plurality of pieces of scenario information based on a pre-stored correspondence between movie-related running information and a movie scenario.

Optionally, after the processor 901 enables the server to obtain the target running information of the terminal within the preset time period, the processor 901 enables the server to parse the captured target running information, and obtain the scenario information of the terminal.

After the processor 901 enables the server to determine the scenario information of the terminal based on the target running information, the processor 901 enables the server to identify the target type of the target text information in the target scenario. Optionally, the processor 901 enables the server to query, based on the target scenario information, for a target entity list corresponding to the target scenario information. The processor 901 enables the server to perform segmentation processing on the target text information. When separate words correspond to a plurality of types, the processor 901 enables the server to perform matching on the target entity list based on the separate words. When the type of the separate word is located in the target entity list, the processor 901 enables the server to classify the separate word as the type in the target entity list, to obtain a target type of the target text information in the target scenario. The target type may be one of an address, a name, a style, and the like related to the target text information. In this way, a type of the target text information is adjusted to a type corresponding to a current scenario, thereby achieving an objective of identifying the target type of the target text information in the target scenario, and improving accuracy for identifying a type of text information.

The processor 901 is further configured to invoke, by using the transmission apparatus 905, the application program stored in the memory 903, to perform the following steps: enabling a server to perform segmentation processing on the target text information, to obtain a plurality of separate words; enabling the server to determine, when a target separate word exists in the plurality of separate words, whether a first type corresponding to the target separate word exists in a preset type list, where the target separate word corresponds to a plurality of types including the first type, and the preset type list includes a type corresponding to the plurality of separate words in the target scenario; and if it is determined that the first type exists in the preset type list, enabling the server to determine the first type as the target type of the target separate word in the target scenario.

The processor 901 enables the server to: after determining the scenario information of the terminal based on the target running information, identify the target type of the target text information in the target scenario. When the processor 901 enables the server to identify the target type of the target text information in the target scenario, the processor 901 enables the server to perform segmentation processing on the target text information, in other words, separate, based on a preset syntax, words included in the target text information, to obtain the plurality of separate words. After the processor 901 enables the server to perform segmentation processing on the target text information, to obtain the plurality of separate words, if the target separate word corresponding to the plurality of types exists in the plurality of separate words, the processor 901 enables the server to determine whether the first type corresponding to the target separate word exists in the preset type list. The plurality of types include the first type, and the first type may be any one of the plurality of types. After the processor 901 enables the server to determine whether the first type corresponding to the target separate word exists in the preset type list, if the processor 901 enables the server to determine that the first type corresponding to the target separate word exists in the preset type list, the processor 901 enables the server to determine the first type as the target type of the target separate word in the target scenario.

If the plurality of target separate words exist in the plurality of separate words, for the plurality of target separate words, the processor 901 enables the server to separately determine, by using the foregoing method, a plurality of target types that are of the plurality of target separate words and that are in the target scenario, and adjust a type of the target text information to a target type corresponding to a current scenario, thereby improving accuracy for identifying the type of the target text information.

The processor 901 is further configured to invoke, by using the transmission apparatus 905, the application program stored in the memory 903, to perform the following step: enabling the server to determine, before determining whether the first type corresponding to the target separate word exists in the preset type list, based on a first correspondence between the target scenario and the preset type list, the preset type list corresponding to the target scenario in a plurality of type lists.

Before the processor 901 enables the server to determine whether the first type corresponding to the target separate word exists in the preset type list, the processor 901 enables the server to obtain the preset type list. The preset type list corresponds to the target scenario indicated by target scenario information. Optionally, a plurality of type lists are pre-stored, and each type list corresponds to a different scenario, for example, a movie scenario, a food and drink scenario, a travel scenario, or a sightseeing scenario. The processor 901 enables the server to determine, based on a first correspondence between the target scenario and the preset type list, the preset type list corresponding to the target scenario in a plurality of type lists.

Optionally, scenario information carries a scenario identifier, the scenario identifier is used for indicating a scenario, the plurality of type lists are respectively identified by using a plurality of type list identifiers that have a correspondence with a preset scenario identifier, and the type list identifier is used for indicating a type list. There is the first correspondence between a target scenario identifier and a preset type list identifier. The processor 901 enables the server to determine a preset type list identifier corresponding to the target scenario in a plurality of type list identifiers based on the first correspondence. A pre-stored preset type list is invoked by using the preset type list identifier, thereby obtaining the preset type list.

The processor 901 is further configured to invoke, by using the transmission apparatus 905, the application program stored in the memory 903, to perform the following step: enabling the server to determine, based on a second correspondence between the target running information and the scenario information, the scenario information corresponding to the target running information in a plurality of pieces of preset scenario information.

The terminal has the second correspondence between the target running information within a preset time period and the scenario information. When determining the scenario information of the terminal based on the target running information, the processor 901 enables the server to determine, based on the second correspondence, the scenario information corresponding to the target running information in the plurality of pieces of preset scenario information.

The processor 901 is further configured to invoke, by using the transmission apparatus 905, the application program stored in the memory 903, to perform the following step: enabling the server to obtain current running information and history running information of the terminal, where the target running information includes the current running information and the history running information.

The processor 901 is further configured to invoke, by using the transmission apparatus 905, the application program stored in the memory 903, to perform the following step: enabling the server to output the target type after identifying the target type of the target text information in the target scenario; and enabling the server to send, to the terminal based on the target type, indication information used for instructing the terminal to perform a preset event.

After the processor 901 identifies the target type of the target text information in the target scenario, the processor 901 enables the server to adjust a type of the target text information to the target type corresponding to the current scenario, and output the target type by using the input/output device 907.

After the processor 901 enables the server to output the target type by using the input/output device 907, the input/output device 907 enables the server to send, to the terminal based on the target type, the indication information used for instructing the terminal to perform the preset event, for example, pushes service indication information related to a target scenario to a user. The service indication information is used for instructing a target terminal to perform a service related to the target scenario, thereby leading the user to experience good service experience, and improving user experience.

The target text information includes information about an APP run on the terminal; information about a character displayed on the terminal; information about a picture displayed on the terminal; information about a web page run on the terminal; information about a voice recorded on the terminal; and information about a chat on the terminal.

According to this embodiment of the present disclosure, a solution for identifying a type of text information is provided. The target text information sent by the terminal at the first time is obtained, where the target text information is text information whose type is to be determined; the target running information of the terminal within the preset time period is obtained, where the preset time period includes the first time; the scenario information of the terminal is determined based on the target running information, where the target running information corresponds to the target scenario indicated by the scenario information; and the target type of the target text information in the target scenario is identified. Because the current scenario information of the terminal is determined based on the running information of the terminal, and the type of the target text information is determined based on the scenario information, improving accuracy for identifying the type of the text information, and resolving a technical problem of difficult identification of the type of the text information in the related technology.

Optionally, for a specific example in this embodiment, refer to the examples described in the foregoing embodiments, and details are not described herein again in this embodiment.

A person skilled in the art may understand that, the structure shown in FIG. 9 is only schematic, and FIG. 9 does not constitute a limitation to the structure of the electronic apparatus. For example, the electronic apparatus may further include more or less components (such as a network interface and a display apparatus) than those shown in FIG. 9, or has a configuration different from that shown in FIG. 9.

A person of ordinary skill in the art can understand that, all or some steps in the methods in the foregoing embodiments may be performed by a program instructing related hardware of a terminal device. The program may be stored in a computer readable storage medium (e.g., a non-transitory computer-readable storage medium).

An embodiment of the present disclosure further provides a storage medium (e.g., a non-transitory computer-readable storage medium). The storage medium includes a stored program. The program performs the method for identifying a type of text information in the present disclosure when being run. Optionally, in this embodiment, the storage medium stores a computer program. The computer program is configured to perform the method for identifying a type of text information when being run.

Optionally, in this embodiment, the storage medium may be located on at least one of a plurality of network devices on the network shown in the foregoing embodiment.

Optionally, in this embodiment, the storage medium is configured to store program code used for performing the following steps:

enabling a server to obtain target text information sent by a terminal at a first time, where the target text information is text information whose type is to be determined;

enabling the server to obtain target running information of the terminal within a preset time period, where the preset time period includes the first time;

enabling the server to determine scenario information of the terminal based on the target running information, where the target running information corresponds to a target scenario indicated by the scenario information; and enabling the server to identify a target type of the target text information in the target scenario.

The storage medium is configured to store program code used for performing the foregoing steps, the server is enabled to obtain the target text information sent by the terminal at the first time, and the first time may be a current time. The target text information corresponds to a plurality of types. After the server is enabled to obtain the target text information sent by the terminal at the first time, the server is enabled to obtain the target running information of the terminal within the preset time period, and may capture information about content displayed on a screen of the terminal.

The running information of the terminal is information generated by the terminal during running of the terminal. After the server is enabled to obtain the target text information sent by the terminal at the first time, the server is enabled to obtain the target running information of the terminal within the preset time period. Information about content displayed on a screen of the terminal may be captured. Information displayed on the screen of the terminal is usually information that can be directly known by the user when the user uses the terminal, and is associated with a current scenario of the terminal. Optionally, the target running information is the information displayed on the screen of the terminal.

Optionally, the storage medium is configured to store program code used for performing the foregoing steps, the server is enabled to select the scenario information corresponding to the target running information from a plurality of pieces of scenario information based on a pre-stored correspondence between the running information of the terminal and the scenario information of the terminal. The target running information corresponds to a target scenario indicated by the scenario information. For example, the target running information is information about a movie-related APP that is run on the terminal, or a movie-related web page that is displayed on the terminal, and then movie scenario information of the terminal at a first time is selected from a plurality of pieces of scenario information based on movie-related running information and a pre-stored correspondence between the movie-related running information and a movie scenario.

Optionally, after the server is enabled to obtain the target running information of the terminal within the preset time period, the server is enabled to parse the captured target running information, and obtain the scenario information of the terminal.

The server is enabled to: after determining the scenario information of the terminal based on the target running information, identify the target type of the target text information in the target scenario. Optionally, the server is enabled to query, based on the target scenario information, for a target entity list corresponding to the target scenario information. The server is enabled to perform segmentation processing on the target text information. When separate words correspond to a plurality of types, the server is enabled to perform matching on the target entity list based on the separate words. When the type of the separate word is located in the target entity list, the separate word is classified as the type in the target entity list, to obtain a target type of the target text information in the target scenario. The target type may be one of an address, a name, a style, and the like related to the target text information. In this way, a type of the target text information is adjusted to a type corresponding to a current scenario, thereby achieving an objective of identifying the target type of the target text information in the target scenario, and improving accuracy for identifying a type of text information.

Optionally, the storage medium is further configured to store program code used for performing the following steps: enabling a server to perform segmentation processing on the target text information, to obtain a plurality of separate words; enabling the server to determine, when a target separate word exists in the plurality of separate words, whether a first type corresponding to the target separate word exists in a preset type list, where the target separate word corresponds to a plurality of types including the first type, and the preset type list includes a type corresponding to the plurality of separate words in the target scenario; and if the server is enabled to determine that the first type exists in the preset type list, enabling the server to determine the first type as the target type of the target separate word in the target scenario.

The storage medium is configured to store program code used for performing the foregoing steps, the server is enabled to: after determining the scenario information of the terminal based on the target running information, identify the target type of the target text information in the target scenario. When the server is enabled to identify the target type of the target text information in the target scenario, the server is enabled to perform segmentation processing on the target text information. After the server is enabled to perform segmentation processing on the target text information, to obtain the plurality of separate words, if the target separate word corresponding to the plurality of types exists in the plurality of separate words, the server is enabled to determine whether the first type corresponding to the target separate word exists in the preset type list. The plurality of types include the first type, and the first type may be any one of the plurality of types. After the server is enabled to determine whether the first type corresponding to the target separate word exists in the preset type list, if determining that the first type corresponding to the target separate word exists in the preset type list, the server is enabled to determine the first type as the target type of the target separate word in the target scenario.

The storage medium is configured to store program code used for performing the foregoing steps, if the plurality of target separate words exist in the plurality of separate words, for the plurality of target separate words, the server is enabled to separately determine, by using the foregoing method, a plurality of target types that are of the plurality of target separate words and that are in the target scenario, and adjust a type of the target text information to a target type corresponding to a current scenario, thereby improving accuracy for identifying the type of the target text information.

Optionally, the storage medium is further configured to store program code used for performing the following step: before enabling the server to determine whether the first type corresponding to the target separate word exists in the preset type list, enabling the server to determine, based on a first correspondence between the target scenario and the preset type list, the preset type list corresponding to the target scenario in a plurality of type lists.

The storage medium is configured to store program code used for performing the foregoing step, before the server is enabled to determine whether the first type corresponding to the target separate word exists in the preset type list, the server is enabled to obtain the preset type list. The preset type list corresponds to the target scenario indicated by target scenario information. Optionally, a plurality of type lists are pre-stored, and each type list corresponds to a different scenario. The server is enabled to determine, based on a first correspondence between the target scenario and the preset type list, the preset type list corresponding to the target scenario in a plurality of type lists.

Optionally, scenario information carries a scenario identifier, the scenario identifier is used for indicating a scenario, the plurality of type lists are respectively identified by using a plurality of type list identifiers that have a correspondence with a preset scenario identifier, and the type list identifier is used for indicating a type list. There is the first correspondence between a target scenario identifier and a preset type list identifier. A preset type list identifier corresponding to the target scenario is determined in a plurality of type list identifiers based on the first correspondence. A pre-stored preset type list is invoked by using the preset type list identifier, thereby obtaining the preset type list.

Optionally, the storage medium is further configured to store program code used for performing the following step: enabling the server to determine, based on a second correspondence between the target running information and the scenario information, the scenario information corresponding to the target running information in a plurality of pieces of preset scenario information.

The storage medium is configured to store program code used for performing the foregoing step, the terminal has the second correspondence between the target running information within a preset time period and the scenario information. When the server is enabled to determine the scenario information of the terminal based on the target running information, the server is enabled to determine, based on the second correspondence, the scenario information corresponding to the target running information in the plurality of pieces of preset scenario information.

Optionally, the storage medium is further configured to store program code used for performing the following step: enabling the server to obtain current running information and history running information of the terminal, where the target running information includes the current running information and the history running information.

Optionally, the storage medium is further configured to store program code used for performing the following steps: enabling the server to output the target type after enabling the server to identify the target type of the target text information in the target scenario; and enabling the server to send, to the terminal based on the target type, indication information used for instructing the terminal to perform a preset event.

The storage medium is configured to store program code used for performing the foregoing step, after the server is enabled to identify the target type of the target text information in the target scenario, the server is enabled to adjust a type of the target text information to the target type corresponding to a current scenario, and output the target type.

The target text information includes information about an APP run on the terminal; information about a character displayed on the terminal; information about a picture displayed on the terminal; information about a web page run on the terminal; information about a voice recorded on the terminal; and information about a chat on the terminal.

Optionally, refer to the examples described in the foregoing embodiments for specific examples in this embodiment. Details are not described in this embodiment.

Optionally, in this embodiment, the foregoing storage medium may include but is not limited to: any medium (e.g., non-transitory computer readable storage medium) that can store program code, such as a USB flash drive, a ROM, a RAM, a removable hard disk, a magnetic disk, or an optical disc.

The method and apparatus for identifying a type of text information, the storage medium, and the electronic apparatus according to the present disclosure are described above by using examples with reference to the accompanying drawings. However, a person skilled in the art should understand that, various improvements may be further made for the method and apparatus for identifying a type of text information, the storage medium, and the electronic apparatus proposed in the present disclosure without departing from content of the present disclosure. Therefore, the protection scope of the present disclosure should be subject to content of the appended claims.

The sequence numbers of the preceding embodiments of the present disclosure are merely for description purpose but do not indicate the preference of the embodiments.

If the integrated units in the foregoing embodiments are implemented in a form of software functional units and are sold or used as an independent product, the units may be stored in a computer readable storage medium. Based on such an understanding, the technical solutions of the present disclosure essentially, or the part contributing to the related technology, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the descriptions of the embodiments have respective focuses. For a part not described in detail in an embodiment, refer to a related description of another embodiment.

In the several embodiments provided in this application, it should be understood that the disclosed terminal may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into processing circuitry. The processing circuitry can be implemented by one processing unit, or each of the units may exist alone physically, or two or more units are integrated into one unit. The integrated units may be implemented in a form of hardware or may be implemented in a form of a software functional unit.

The foregoing descriptions are merely exemplary implementations of the present disclosure. It should be noted that a person of ordinary skill in the art may make several improvements or polishing without departing from the principle of the present disclosure, and the improvements or polishing shall also fall within the protection scope of the present disclosure.

INDUSTRIAL APPLICABILITY

In the embodiments of the present disclosure, the target text information sent by the terminal at the first time is obtained, where the target text information is text information whose type is to be determined; the target running information of the terminal within the preset time period is obtained, where the preset time period including the first time; the scenario information of the terminal is determined based on the target running information, where the target running information corresponds to the target scenario indicated by the scenario information; and the target type of the target text information in the target scenario is identified. Because the current scenario information of the terminal is determined based on the running information of the terminal, and the type of the target text information is determined based on the scenario information, an objective to identify the target type of the target text information in the target scenario is achieved, thereby achieving a technical effect of improving accuracy for identifying the type of the text information, and resolving the technical problem of the difficult identification of the type of the text information in the related technology.

What is claimed is:

1. A method for identifying a type of text information, comprising:
   receiving, by a server, target text information from a terminal;
   obtaining, by the server, usage information of the terminal within a preset time period in which the target text information is received;
   determining, by the server, scenario information of the terminal based on the usage information, the usage information corresponding to a target scenario indicated by the scenario information; and
   identifying, by the server, a target type of the target text information that is identified by the target scenario.

2. The method according to claim 1, wherein the usage information is contextual information for identifying the target type of the target text information.

3. The method according to claim 1, wherein the identifying comprises:
   segmenting, by the server, target text of the target text information into a plurality of separate words;
   determining, by the server when a target separate word is included in the plurality of separate words, whether a first type of a plurality of candidate types corresponding to the target separate word is included in a preset type list of the target scenario; and
   determining, by the server after the first type is determined to be included in the preset type list, the first type as the target type of the target separate word.

4. The method according to claim 3, wherein before the determining whether the first type of the plurality of candidate types corresponding to the target separate word is included in the preset type list of the target scenario, the method further comprises:
   determining, by the server based on a first correspondence between the target scenario and the preset type list, the preset type list corresponding to the target scenario from a plurality of type lists.

5. The method according to claim 1, wherein the determining the scenario information comprises:
determining, by the server, the scenario information of the terminal based on a second correspondence between the usage information and the scenario information, the scenario information corresponding to the usage information being one of a plurality of pieces of preset scenario information.

6. The method according to claim 1, wherein after the identifying the target type, the method further comprises:
outputting, by the server, the target type; and
sending, by the server indication information to the terminal based on the target type, the indication information instructing the terminal to perform a preset process.

7. The method according to claim 1, wherein the usage information of the terminal includes at least one or more of:
information about an application executed on the terminal;
information about a character displayed by the terminal;
information about a picture displayed by the terminal;
information about a web page displayed by the terminal;
information about a voice recorded on the terminal; and
information about a chat on the terminal.

8. An apparatus, comprising:
processing circuitry configured to
receive target text information from a terminal;
obtain usage information of the terminal within a preset time period in which the target text information is received;
determine scenario information of the terminal based on the usage information, the usage information corresponding to a target scenario indicated by the scenario information; and
identify a target type of the target text information that is identified by the target scenario.

9. The apparatus according to claim 8, wherein the usage information is contextual information for identifying the target type of the target text information.

10. The apparatus according to claim 8, wherein the processing circuitry is further configured to
segment target text of the target text information into a plurality of separate words;
determine, when a target separate word is included in the plurality of separate words, whether a first type of a plurality of candidate types corresponding to the target separate word is included in a preset type list of the target scenario; and
determine, after the first type is determined to be included in the preset type list, the first type as the target type of the target separate word.

11. The apparatus according to claim 10, wherein the processing circuitry is further configured to
determine, based on a first correspondence between the target scenario and the preset type list, the preset type list corresponding to the target scenario from a plurality of type list before the determination of whether the first type of the plurality of candidate types corresponding to the target separate word is included in the preset type list of the target scenario s.

12. The apparatus according to claim 8, wherein the processing circuitry is further configured to
determine the scenario information of the terminal based on a second correspondence between the usage information and the scenario information, the scenario information corresponding to the usage information being one of a plurality of pieces of preset scenario information.

13. The apparatus according to claim 8, wherein the processing circuitry is further configured to:
output the target type; and
send indication information to the terminal based on the target type, the indication information instructing the terminal to perform a preset process.

14. The apparatus according to claim 8, wherein the usage information of the terminal includes at least one or more of:
information about an application executed on the terminal;
information about a character displayed by the terminal;
information about a picture displayed by the terminal;
information about a web page displayed by the terminal;
information about a voice recorded on the terminal; and
information about a chat on the terminal.

15. A non-transitory computer readable storage medium storing instructions which when executed by at least one processor cause the at least one processor to perform:
receiving target text information from a terminal;
obtaining usage information of the terminal within a preset time period in which the target text information is received;
determining scenario information of the terminal based on the usage information, the usage information corresponding to a target scenario indicated by the scenario information; and
identifying a target type of the target text information that is identified by the target scenario.

16. The non-transitory computer readable storage medium according to claim 15, wherein the usage information is contextual information for identifying the target type of the target text information.

17. The non-transitory computer readable storage medium according to claim 15, wherein the identifying comprises:
segmenting target text of the target text information into a plurality of separate words;
determining, when a target separate word is included in the plurality of separate words, whether a first type of a plurality of candidate types corresponding to the target separate word is included in a preset type list of the target scenario; and
determining, after the first type is determined to be included in the preset type list, the first type as the target type of the target separate word.

18. The non-transitory computer readable storage medium according to claim 17, wherein before the determining whether the first type of the plurality of candidate types corresponding to the target separate word is included in the preset type list of the target scenario, the instructions when executed by the at least one processor further cause the at least one processor to perform:
determining, based on a first correspondence between the target scenario and the preset type list, the preset type list corresponding to the target scenario from a plurality of type lists.

19. The non-transitory computer readable storage medium according to claim 15, wherein the determining the scenario information comprises:
determining, by the server, the scenario information of the terminal based on a second correspondence between the usage information and the scenario information, the scenario information corresponding to the usage information being one of a plurality of pieces of preset scenario information.

20. The non-transitory computer readable storage medium according to claim 15, wherein after the identifying the target type, the instructions when executed by the at least one processor further cause the at least one processor to perform:
   outputting the target type; and
   sending indication information to the terminal based on the target type, the indication information instructing the terminal to perform a preset process.

* * * * *